United States Patent
Kimura

(10) Patent No.: US 9,676,412 B2
(45) Date of Patent: Jun. 13, 2017

(54) DRIVING ASSISTANCE APPARATUS AND METHOD

(71) Applicant: TOYOTA JIDOSHA KABUSHIKI KAISHA, Toyota-shi, Aichi-ken (JP)

(72) Inventor: Kenji Kimura, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 35 days.

(21) Appl. No.: 14/690,842

(22) Filed: Apr. 20, 2015

(65) Prior Publication Data

US 2015/0307130 A1 Oct. 29, 2015

(30) Foreign Application Priority Data

Apr. 28, 2014 (JP) ................................ 2014-092330

(51) Int. Cl.
| | |
|---|---|
| *B62D 15/02* | (2006.01) |
| *B60W 30/10* | (2006.01) |
| *G08G 1/16* | (2006.01) |

(52) U.S. Cl.
CPC ........... *B62D 15/025* (2013.01); *B60W 30/10* (2013.01); *G08G 1/16* (2013.01); *G08G 1/167* (2013.01)

(58) Field of Classification Search
CPC .. B62D 15/025; B62D 6/003; G01C 21/3626; G01C 21/3602
See application file for complete search history.

(56) References Cited

U.S. PATENT DOCUMENTS

| | | | | |
|---|---|---|---|---|
| 2004/0227647 | A1* | 11/2004 | Yanai | B60R 1/00 340/995.1 |
| 2005/0015203 | A1* | 1/2005 | Nishira | G08G 1/167 701/301 |
| 2008/0040033 | A1* | 2/2008 | Mutoh | G01C 21/367 701/437 |
| 2008/0091318 | A1* | 4/2008 | Deng | B62D 6/003 701/41 |

(Continued)

FOREIGN PATENT DOCUMENTS

| | | |
|---|---|---|
| DE | 102009019702 A1 | 11/2009 |
| DE | 102011121948 A1 | 6/2013 |

(Continued)

OTHER PUBLICATIONS

Communication dated Jul. 22, 2016 from the German Patent and Trademark Office in counterpart application No. 102015207123.5.

*Primary Examiner* — Redhwan K Mawari
(74) *Attorney, Agent, or Firm* — Sughrue Mion, PLLC

(57) ABSTRACT

A driving assistance apparatus causes a vehicle to follow a target track by assisting steering of the vehicle. The apparatus includes a followed target recognition section, a steering assistance control section, and an information providing section. The target recognition section recognizes the target track ahead in the advancing direction of the vehicle. The steering assistance control section controls a steering apparatus to perform steering assistance, thereby causing the vehicle to follow the target track. In a case where there is a branch point ahead in the advancing direction of the vehicle, the information providing section provides the driver with information related to a first branch road corresponding to the target track in a plurality of branch roads branching from the branch point.

5 Claims, 7 Drawing Sheets

(56) References Cited

U.S. PATENT DOCUMENTS

| | | | |
|---|---|---|---|
| 2009/0222202 A1* | 9/2009 | Kato | .................. G01C 21/3658 |
| | | | 701/414 |
| 2012/0197525 A1* | 8/2012 | Noro | .................... G09B 29/106 |
| | | | 701/437 |
| 2013/0179023 A1 | 7/2013 | Schmidt | |

FOREIGN PATENT DOCUMENTS

| | | |
|---|---|---|
| DE | 102012005779 A1 | 9/2013 |
| DE | 102014225752 A1 | 6/2015 |
| JP | 7-272197 A | 10/1995 |
| JP | 11-99851 A | 4/1999 |
| JP | 2000-207692 A | 7/2000 |
| JP | 2005-228139 A | 8/2005 |
| JP | 2007-313978 A | 12/2007 |

* cited by examiner

DRIVING ASSISTANCE APPARATUS AND METHOD

BACKGROUND OF THE INVENTION

The present invention relates to a driving assistance apparatus and method for performing steering assistance for causing a vehicle to follow a target track.

Heretofore, there is known an apparatus that assists in driving by performing steering assistance for causing a vehicle to follow a target track. The apparatus causes a vehicle to follow a track based on a lane division line and to follow a traveling track of a preceding vehicle, for example.

For example, Japanese Laid-Open Patent Publication No. 2007-313978 describes a steering control apparatus that recognizes a lane division line to prevent a vehicle from departing from the lane in which the vehicle is running. In a case where a branch point exists ahead the vehicle and a recommended route that is recommended by route guidance is different from the lane in which the vehicle is running, the apparatus reduces a reference value for a first amount of operation, which includes the amount of steering torque, a steering angle, and the like. The apparatus stops steering assistance when the first amount of operation reaches the reference value.

SUMMARY OF THE INVENTION

In the apparatus described above, in a case where a branch point exists ahead of a vehicle and a recommended route is different from the lane in which the vehicle is running, the steering control is likely to be stopped. As a result, a lane change to a direction intended by the driver is facilitated. Unfortunately, before reaching the branch point, it is hard to grasp which lane in a plurality of lanes divided from the branch point is recognized as the lane in which the vehicle is running by the apparatus. In addition, steering operation for a lane change by the driver may be also delayed. Such a problem is generally common to not only a driving assistance apparatus for causing a vehicle to follow a lane in which the vehicle is running but also to a driving assistance apparatus for causing a vehicle to follow a target track.

It is an objective of the present invention to provide a driving assistance apparatus capable of properly performing steering assistance even near branch roads.

To achieve the foregoing objective, a driving assistance apparatus is provide that that causes a vehicle to follow a target track by assisting in steering of the vehicle. The apparatus includes a target recognition section that recognizes the target track ahead in an advancing direction of the vehicle, a steering assistance control section that controls a steering apparatus to perform steering assistance, thereby causing the vehicle to follow the target track, and an information providing section that, in a case where there is a branch point ahead in the advancing direction of the vehicle, provides a driver with information related to a first branch road corresponding to the target track in a plurality of branch roads branching from the branch point.

In accordance with another aspect of the present invention, a method for assisting driving is provided that causes a vehicle to follow a target track by assisting in steering of the vehicle. The method includes: recognizing the target track ahead in an advancing direction of the vehicle; controlling a steering apparatus to perform steering assistance, thereby causing the vehicle to follow the target track; and in a case where there is a branch point ahead in the advancing direction of the vehicle, providing a driver with information related to a first branch road corresponding to the target track in a plurality of branch roads branching from the branch point.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A driving assistance apparatus 10 according to a first embodiment will now be described with reference to FIGS.

1 to 10. The driving assistance apparatus 10 is mounted on a vehicle 100 such as a passenger car that a driver operates.

The driving assistance apparatus 10 in the present embodiment includes a function referred to as lane keeping assist (LKA), which performs automatic steering by recognizing a lane (traveling lane) in which the vehicle 100 is running on the basis of right and left lane division lines marked on the road to prevent the vehicle 100 from departing from the recognized driving lane.

Figure 1:
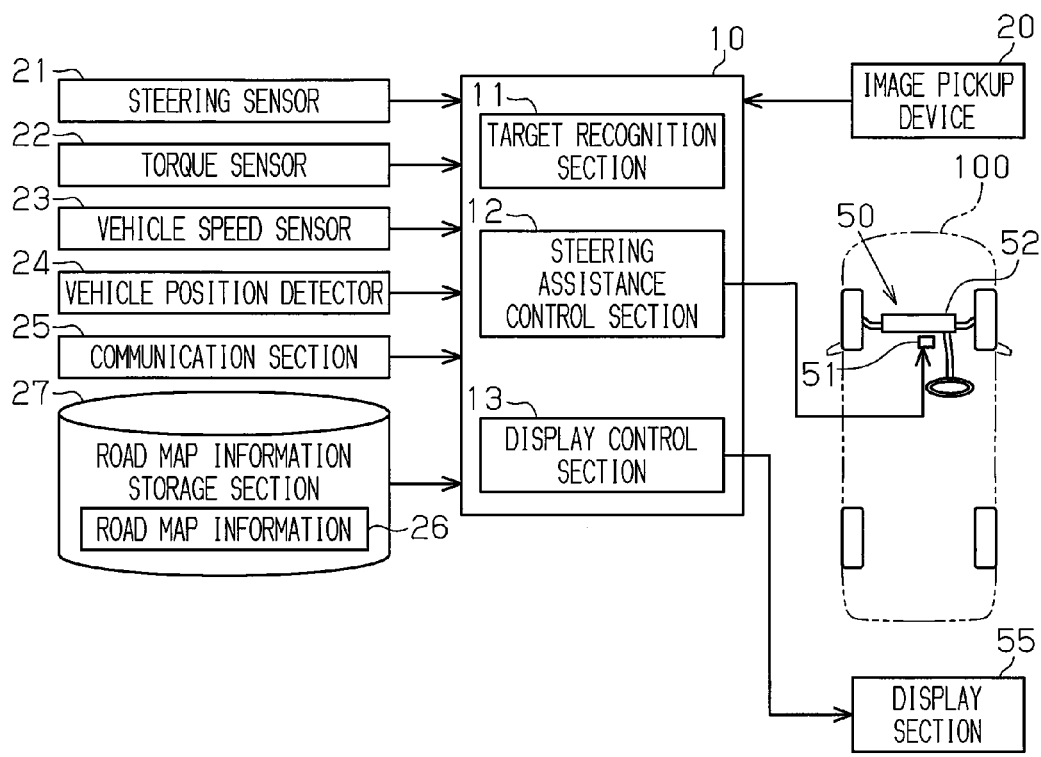
FIG. 1 is a block diagram schematically showing the configuration of a driving assistance apparatus according to a first embodiment.

With reference to FIG. 1, the outline of a driving assistance system including the driving assistance apparatus 10 will be described. The driving assistance apparatus 10 includes a target recognition section 11, a steering assistance control section 12 that controls automatic steering based on the LKA, and a display control section 13 serving as an information providing section that provides the driver with information related to the LKA. The driving assistance apparatus 10 is composed of an arithmetic section, a storage section, and the like. The storage section stores programs for executing steering assistance and the like. The target recognition section 11, the steering assistance control section 12, and the display control section 13 may perform various control tasks by using an arithmetic section and a storage section included in each of the sections or by using common arithmetic section, storage section, and the like.

The target recognition section 11 acquires image data from an image pickup device 20 provided in the vehicle 100. The image pickup device 20 is provided in a position where it is possible to pick up images of the road surface in a range including at least the front, the front right side, and the front left side, of the vehicle 100. The target recognition section 11 recognizes lane division lines marked on the road by using the acquired image data, according to a known image processing method such as edge detection.

The target recognition section 11 recognizes a relative position of the vehicle 100 with respect to the right and left lane division lines to calculate deviation from a target track that is set inside of the lane division lines by a predetermined amount. In addition, the target recognition section 11 recognizes lane division lines in front of the vehicle to detect whether there is a branch of the road. The lane division lines include a center line of a roadway, a lane boundary line, a division line such as an outside line of a roadway, and the like. A form of the lines includes a continuous line, a broken line, a dotted line, and the like. The kind of color includes white, yellow, and the like.

The steering assistance control section 12 calculates a steering direction and the amount of steering to cause the vehicle 100 to follow the target track on the basis of the deviation from the target track calculated by the target recognition section 11. Then, the steering assistance control section 12 outputs the steering direction and the amount of steering to a steering control section 51 that drives an actuator 52 of a steering system 50 serving as a steering apparatus. The amount of steering is a steering angle θ or steering torque T, for example.

The display control section 13 outputs information related to the LKA to a display section 55 provided in the vehicle 100.

In addition, the driving assistance apparatus 10 receives the steering angle θ from a steering sensor 21, and receives the steering torque T from a torque sensor 22. Further, the driving assistance apparatus 10 receives a vehicle speed from a vehicle speed sensor 23, and receives the current position of the vehicle from a vehicle position detector 24. For the vehicle position detector 24, a detector capable of detecting the vehicle position is available, and the detector calculates the vehicle position by using at least one of electronic navigation based on a global positioning system (GPS) sensor, and autonomous navigation in which the vehicle position is calculated from the vehicle speed, the moving direction of the vehicle, and the like.

Furthermore, the driving assistance apparatus 10 is capable of acquiring information acquired by road-to-vehicle communication, information acquired by vehicle-to-vehicle communication, and information transmitted from an external server, from a communication section 25 connectable to an external network. For example, the communication section 25 acquires information related to branch points and facilities in a predetermined area, road traffic information including whether there is congestion, and the like.

In addition, the driving assistance system includes a road map information storage section 27 that stores road map information 26. The road map information 26 includes information related to nodes showing branch points and intersections, and information related to links connecting between the nodes. Each of the nodes has identification information provided and is associated with an absolute position coordinate. In addition, the link also has identification information provided, and nodes to which the links connect are discriminable. In association with nodes and links, the road map information 26 includes connection information showing whether a branch point connects to a diverting and merging section such as a junction and an exit on a highway, and whether the branch point connects to a specific facility such as a rest area, as attribute information.

Figure 2:
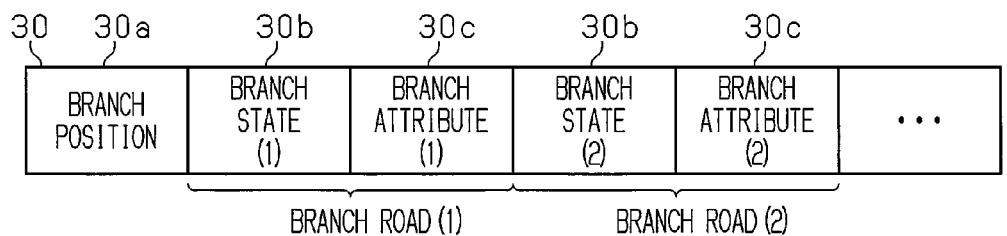
FIG. 2 is a schematic diagram showing an example of branch information in the driving assistance apparatus of FIG. 1.

As shown in FIG. 2, the driving assistance apparatus 10 acquires branch information 30 including a branch position 30a, a branch state 30b, and a branch attribute 30c, from the communication section 25 or the road map information 26. The branch position 30a is indicated by an absolute coordinate of a node, an absolute coordinate of a specific location corresponding to a branch point, or the like. Each of the branch state 30b and the branch attribute 30c corresponds to a lane (branch road) branching from the branch point. In the present embodiment, not only where a connection road (ramp way) branches from a main lane, but also where a main lane branches into a plurality of lanes, the road is treated as a branch road.

The branch state 30b shows a direction or a position of a branch road, for example. The branch attribute 30c is information showing a connection state of a branch road. For example, the branch attribute 30c shows a connection destination of a branch road, and shows that the branch road connects which of a diverting and merging section such as a junction and an exit on a highway, and a specific facility such as a rest area. Data organization shown in FIG. 2 shows an example of the branch information 30 read into the driving assistance apparatus 10, and does not show data organization received by the communication section 25 or data organization of the road map information 26.

The display section 55 will be described with reference to FIGS. 3 and 4.

Figure 3:
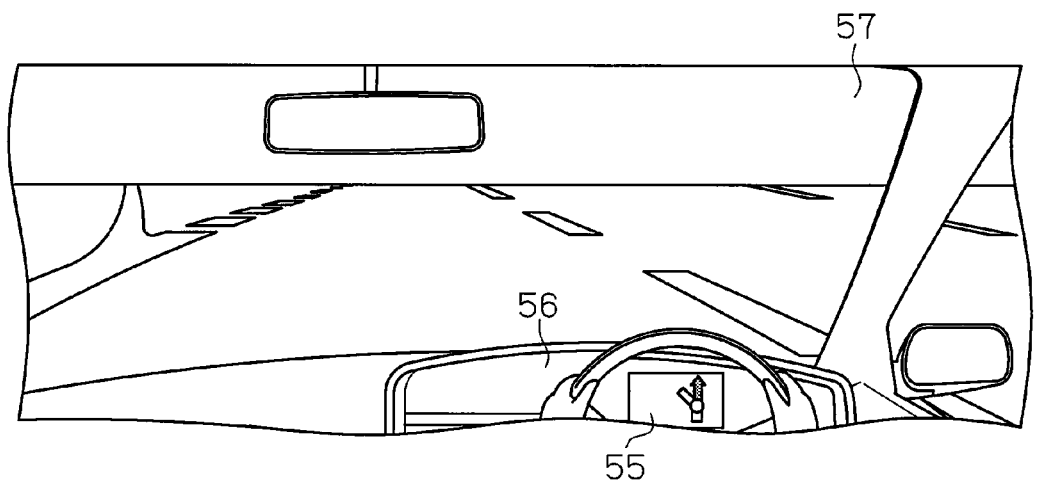
FIG. 3 is a schematic diagram showing one form of the display section in the driving assistance apparatus of FIG. 1.

As shown in FIG. 3, the display section 55 is provided in an instrument panel 56, for example, and displays guidance related to the LKA in a screen.

Figure 4:
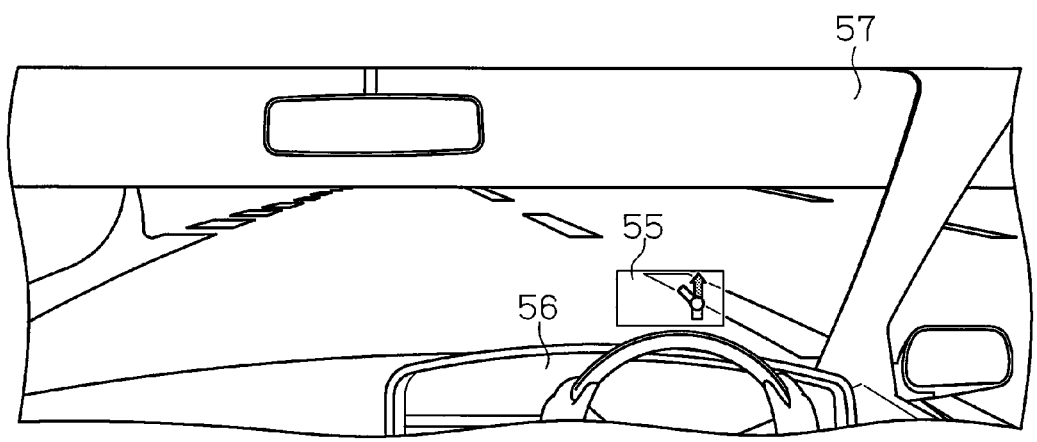
FIG. 4 is a schematic diagram showing one form of the display section in the driving assistance apparatus of FIG. 1.

In addition, as shown in FIG. 4, the display section 55 may display an image in a windshield 57 or at a position in the driver's field of vision in a portion near the driver seat, to be projected onto (not shown). In this case, the display section 55 includes a projection section for projecting an image to display the guidance related to the LKA in a windshield, at the portion to be projected onto.

Next, with reference to FIGS. 5A to 5D, patterns of guidance view related to the LKA that are displayed on the display section 55 will be described.

Figure 5A:
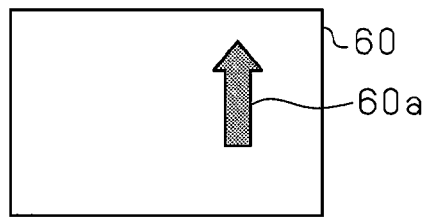
FIG. 5A shows a first display pattern that is displayed in each of the display sections of FIGS. 3 and 4 if a branch point is not detected.

FIG. 5A shows a branch guidance view 60 in a first display pattern. The branch guidance view 60 is displayed in a case where the target recognition section 11 does not recognize a branch point. FIG. 5A shows an arrow 60a that indicates a branch road to which a target track is set.

Figure 5B:
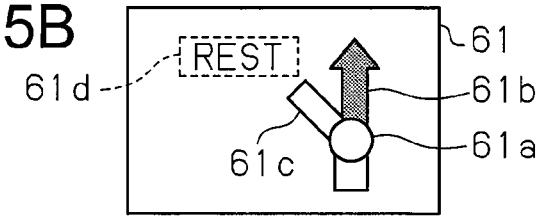
FIG. 5B shows a second display pattern that is displayed in each of the display sections of FIGS. 3 and 4.

FIG. 5B shows a branch guidance view 61 in a second display pattern. The second display pattern is displayed in a case where the target recognition section 11 recognizes that there is a branch point and the branch road branched from the branch point connects to a specific facility such as a rest area. In the branch guidance view 61, two branch roads 61b and 61c, which branch from a branch point 61a, are displayed in different colors On the branch road that connects to the facility such as a rest area, a symbol 61d such as "REST" showing that the road connects to the facility is displayed. The example shows that a branch road corresponding to the target track is the right branch road with respect to the branch point 61a in a discriminable manner.

Figure 5C:
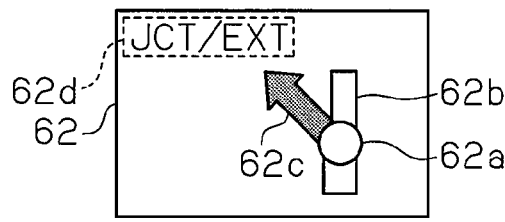
FIGS. 5C and 5D show third display patterns that are displayed in each of the display sections of FIGS. 3 and 4.
Figure 5D:
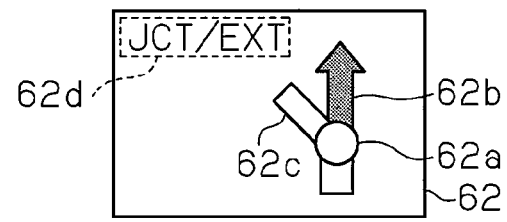

Each of FIGS. 5C and 5D shows a branch guidance view 62 in a third display pattern. The third display pattern is displayed in a case where the target recognition section 11 recognizes that there is a branch point and the branch road branched from the branch point connects to a diverting and merging section such as a junction and an exit on a highway.

In the branch guidance view 62 shown in FIG. 5C, two branch roads 62b and 62c, which branch from a branch point 62a, are displayed different color. On the branch road that connects to the diverting and merging section such as a junction and an exit, a symbol 62d such as "JCT/EXT" showing that the road connects to the diverting and merging section such as a junction and an exit is displayed to correspond to the branch road. The example shows that a branch road corresponding to the target track is the left branch road 62c with respect to the branch point 62a in a discriminable manner. The branch guidance view 62 shown in FIG. 5D shows that a branch road corresponding to the target track is the right branch road 62b with respect to the branch point 62a in a discriminable manner.

Figure 6:
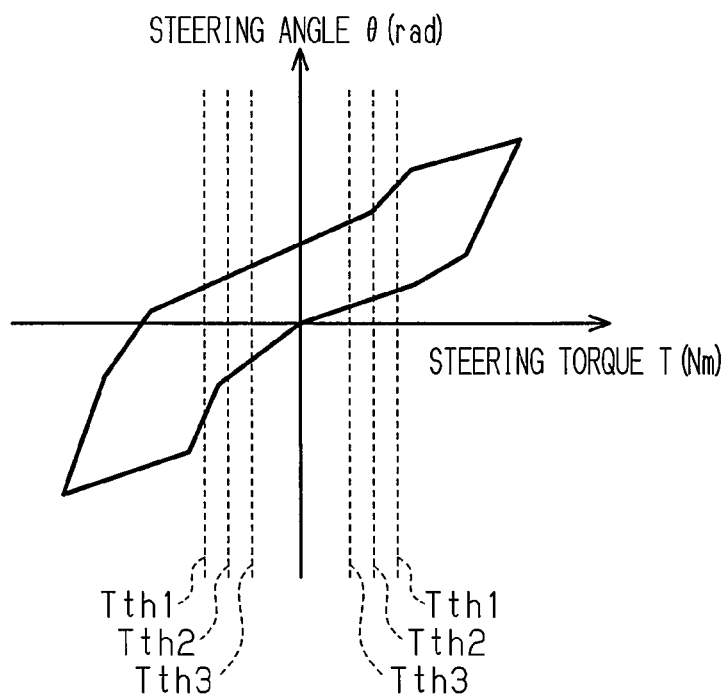
FIG. 6 is a diagram showing a threshold value used for stopping steering assistance.

Next, with reference to FIG. 6, threshold values Tth1 to Tth3 of steering torque for stopping steering assistance that causes a vehicle to follow a target track will be described. Broken lines in FIG. 6 show threshold values, which are set in accordance with the driving environment of the vehicle 100. Each of the threshold values Tth1 to Tth3 is set for both a positive steering angle θ and a negative steering angle θ. A solid line in FIG. 6 shows the steering torque T acting on the actuator 52 of the steering system 50 as reaction force. The steering torque T varies with respect to the steering angle θ. The reaction force torque includes reaction force torque received by the tires from the road surface by steering, and the friction torque of the actuator 52. Usually, steering operation by the driver is performed at a steering angle and steering torque along the solid line.

The first threshold value Tth1, which has the largest absolute value among the threshold values Tth1 to Tth3, is set in a case where the target recognition section 11 does not recognize a branch point. The second threshold value Tth2, which has an absolute value less than that of the first threshold value Tth1, is set in a case where the target recognition section 11 recognizes a branch point and a branch road from the branch point connects to a specific facility such as a rest area. The third threshold value Tth3, which has the smallest absolute value, is set in a case where the target recognition section 11 recognizes a branch point, and a branch road from the branch point connects to a diverting and merging section such as a junction and an exit on a highway. In the diverting and merging section, if a vehicle enters a lane other than a lane in a direction intended by the driver, the vehicle is forced to detour or to have a route change. In addition, in order to run along a route intended by the driver, importance or possibility of a lane change in a diverting and merging section is relatively high. Thus, a small threshold value is set to a branch road connecting to a diverting and merging section.

In a case where the first threshold value Tth1 is set as the threshold value of the steering torque T, since a large torque and a large steering angle θ are required as steering torque for stopping the steering assistance described above, the steering assistance described above cannot be easily canceled. In a case where the second threshold value Tth2 or the third threshold value Tth3 is set as the threshold value of the steering torque T, since the steering torque for stopping the steering assistance described above becomes small as compared with the case where the first threshold value Tth1 is set, steering operation for a lane change is facilitated.

Next, with reference to FIGS. 7 and 8, operation of driving assistance apparatus 10 will be described together with a steering assistance process. The process starts when a starting condition of the steering assistance is satisfied and repeats at predetermined intervals until an end condition is satisfied.

Figure 7:
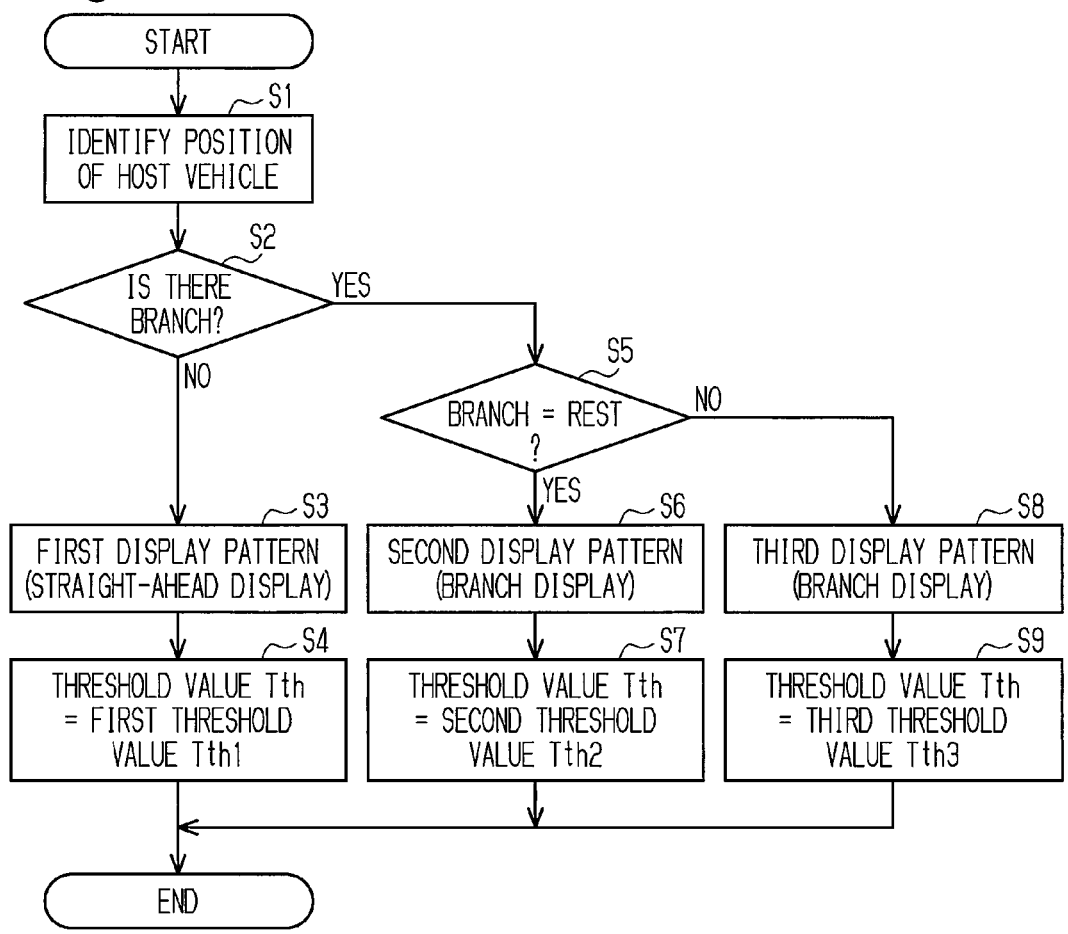
FIG. 7 is a flowchart showing operation of the driving assistance apparatus of FIG. 1.

As shown in FIG. 7, the driving assistance apparatus 10 acquires the position of the vehicle 100 from the vehicle position detector 24 (step S1). The steering assistance control section 12 receives a recognition result from the target recognition section 11 to determine whether there is a branch point ahead in the advancing direction of the vehicle 100 (step S2). That is, it is determined whether a branch point is detected by image processing for recognizing lane division lines by using image data. Information showing whether there is a branch point is output to the display control section 13.

If the steering assistance control section 12 determines that there is no branch point ahead in the advancing direction of the vehicle 100 (NO at step S2), the display control section 13 causes guidance to be displayed in the first display pattern described above (step S3).

In addition, the steering assistance control section 12 sets a threshold value Tth for stopping the steering assistance described above to the first threshold value Tth1 described above (step S4). If the threshold value Tth is set and the end condition described above is not satisfied, the process returns to step S1 so that the process described above is repeated.

On the other hand, if the steering assistance control section 12 determines that there is a branch point ahead in the advancing direction of the vehicle at step S2 from a result of image processing (YES at step S2), the steering assistance control section 12 determines whether a branch road branching from the branch point connects to a specific facility such as a rest area (a gateway thereof, for example), on the basis of the branch information 30 described above (step S5).

If the steering assistance control section 12 determines that the branch point connects to the specific facility such as a rest area (YES at step S5), the display control section 13 causes guidance to be displayed in the second display pattern described above (step S6). In addition, the steering assistance control section 12 sets the threshold value Tth for stopping the steering assistance described above to the second threshold value Tth2 described above (step S7).

If the steering assistance control section 12 determines that the branch point described above does not connect to the specific facility such as a rest area (NO at step S5), the display control section 13 causes guidance to be displayed in the third display pattern described above (step S8). In addition, the steering assistance control section 12 sets a threshold value Tth for stopping the steering assistance described above to the third threshold value Tth3 described above (step S9).

In parallel with the processing by procedure described above, the driving assistance apparatus 10 performs the steering assistance for causing the vehicle 100 to follow a target track based on lane division lines, on the basis of the threshold value Tth.

Figure 8:
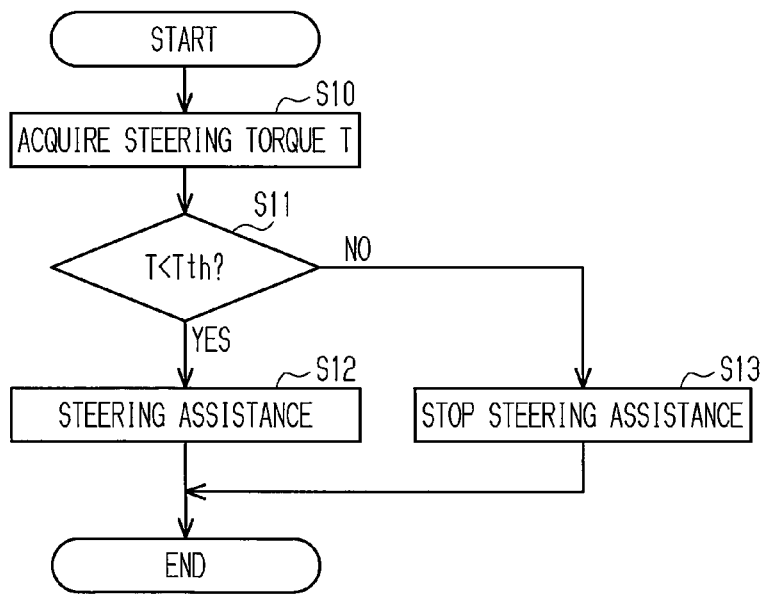
FIG. 8 is a flowchart showing operation of the driving assistance apparatus of FIG. 1.

As shown in FIG. 8, the steering assistance control section 12 acquires the steering torque T from the torque sensor 22 (step S10), and determines whether the acquired steering torque T is less than the threshold value Tth (step S11).

If the acquired steering torque T is less than the threshold value Tth (YES at step S11), the driving assistance apparatus 10 calculates the steering direction and the amount of steering to cause the vehicle 100 to follow the target track, and performs the steering assistance described above on the basis of the steering direction and the amount of steering (step S12).

If the acquired steering torque T is greater than or equal to the threshold value Tth (NO at step S11), the driving assistance apparatus 10 stops the steering assistance described above (step S13). Accordingly, since priority is given to steering operation by the driver, the driver can easily change the lane to an adjacent lane by performing a steering operation.

Next, with reference to FIGS. 9 and 10, a function acquired by operation of the driving assistance apparatus 10 described above will be described.

Figure 9:
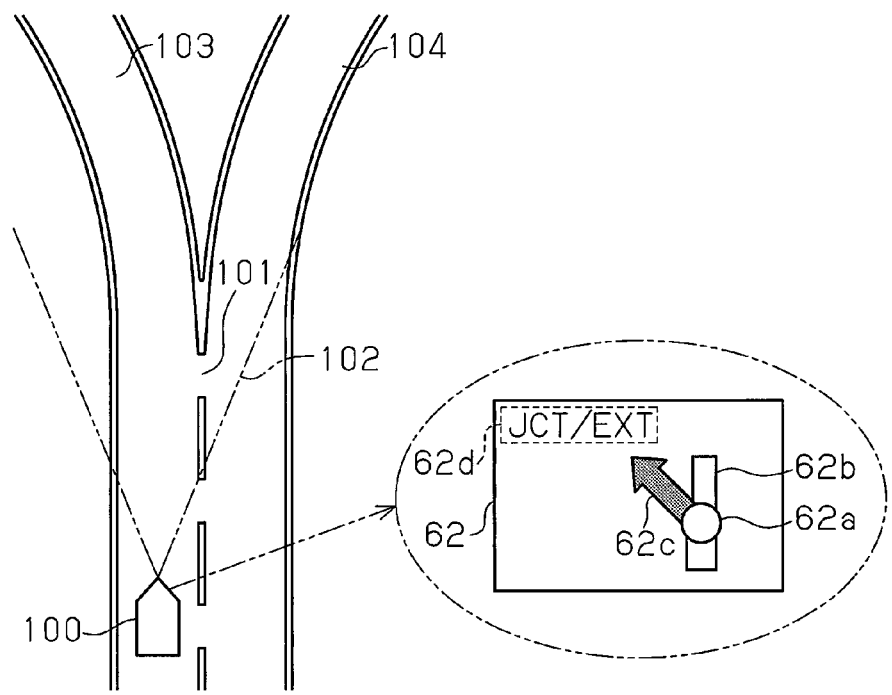
FIG. 9 is a schematic diagram showing a function of the driving assistance apparatus of FIG. 1.

As shown in FIG. 9, when a branch point 101 ahead in the advancing direction of the vehicle 100 enters an imaging range 102 of the image pickup device 20, the target recognition section 11 detects branch roads 103 and 104. At this time, as shown on the right side of FIG. 9, the display control section 13 causes the branch road 103 corresponding to the target track to be displayed to be discriminable from the other branch road 104. That is, the branch road 62c in the branch guidance view 62 is displayed in association with the branch road 103 corresponding to the target track, and the branch road 62b in the branch guidance view 62 is displayed in association with the other branch road 104.

In addition, in a case where the branch road 103 connects to the diverting and merging section described above, the branch guidance view 62 is displayed in the third pattern. In the branch guidance view 62 in the third pattern, the branch road 62c is displayed in association with the symbol 62d showing that the branch road 62c is a diverting and merging section.

Further, the threshold value Tth for stopping the steering assistance described above is set to the third threshold value Tth3. The driver visually identifies the branch guidance view 62 in the third display pattern to recognize the branch road 103 that is set as a target of the steering assistance provided by the driving assistance apparatus 10. If the direction intended by the driver is different from the direction of the branch road 103 that is set as the target of the steering assistance, the driver performs steering operation to change the lane. When steering torque applied to the actuator 52 of the steering system 50 becomes greater than or equal to the third threshold value Tth3, the driving assistance apparatus 10 stops the steering operation described above.

Figure 10:
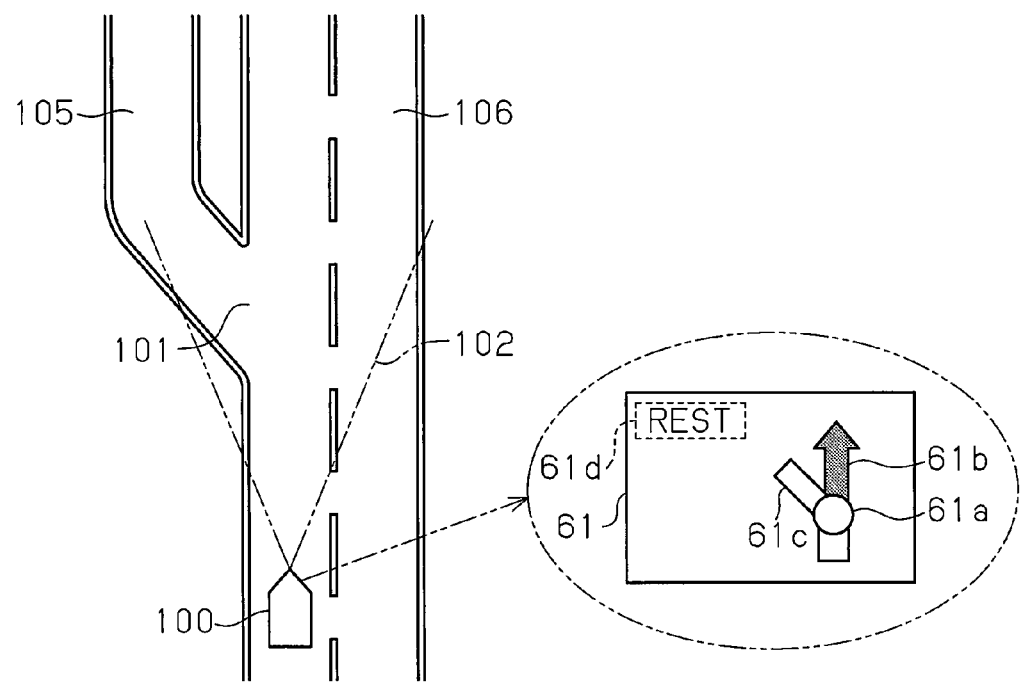
FIG. 10 is a schematic diagram that describes a function of the driving assistance apparatus of FIG. 1.

As shown in FIG. 10, in a case where there is a branch road 105 connecting to a rest area ahead in the advancing direction of the vehicle 100, the branch guidance view 61 in the second display pattern is displayed so that the branch road 61c is displayed in association with the symbol 62d showing that the branch road 61c is a gateway of a rest area or the like. In addition, the threshold value Tth for stopping the steering assistance described above is set to the second threshold value Tth2. The driver visually identifies the branch guidance view 61 in the second display pattern to recognize that there is the branch road 105 branching from a main roadway 106 that connects to a rest area. Then, the target track is set to the main roadway 106. If the driver stops at the rest area, the driver performs steering operation to change the lane. When steering torque applied to the actuator 52 of the steering system 50 becomes greater than or equal to the second threshold value Tth2, the driving assistance apparatus 10 stops the steering operation described above.

As described above, the present embodiment has the following advantages.

(1) Information related to a branch road recognized by the target recognition section 11, such as information related to a branch road corresponding to a target track, is provided to the driver. This allows the driver to easily determine whether his/her intended advancing direction matches with the branch road corresponding to the target track, before reaching the branch point, for example. Thus, it is possible to properly perform the steering assistance even near the branch road.

(2) The display section 55 displays a branch road corresponding to a target track and the other branch roads, branch from a branch point in a discriminable manner. Thus, the driver may selectively determine which of branch roads ahead in the advancing direction of the vehicle 100 corresponds to the target track. This allows the driver to easily determine whether the branch road corresponding to the target track is along his/her intended advancing direction.

(3) The threshold value Tth for stopping the steering assistance described above is changed in accordance with a connection state of a branch road, such as a junction and a rest area, for example. That is, in a connection state in which importance or possibility of a lane change is high, the threshold value Tth is set low. Thus, it is possible to perform appropriate assistance corresponding to the driver's intention.

(4) In a case where a certain branch road has a specific connection state, that is, in a case where the connection state of the branch road is a specific connection state, such as a junction and a rest area, information related to the connection state of the branch road is provided to the display section 55. For example, display related to a connection state, such as "JCT/EXT," and "REST," in association with the branch road, is output to the display section 55. Thus, the driver can easily determine whether a branch road corresponding to a target track matches with his/her intended advancing direction.

Second Embodiment

Next, a driving assistance apparatus according to a second embodiment will be described. Differences from the first embodiment will mainly be discussed. The driving assistance apparatus of the present embodiment has a basic configuration that is the same as that of the first embodiment. In the drawings, like or the same reference numerals are given to those components in the second embodiment that are like or the same as the corresponding components of the first embodiment and detailed explanations are omitted.

Figure 11:
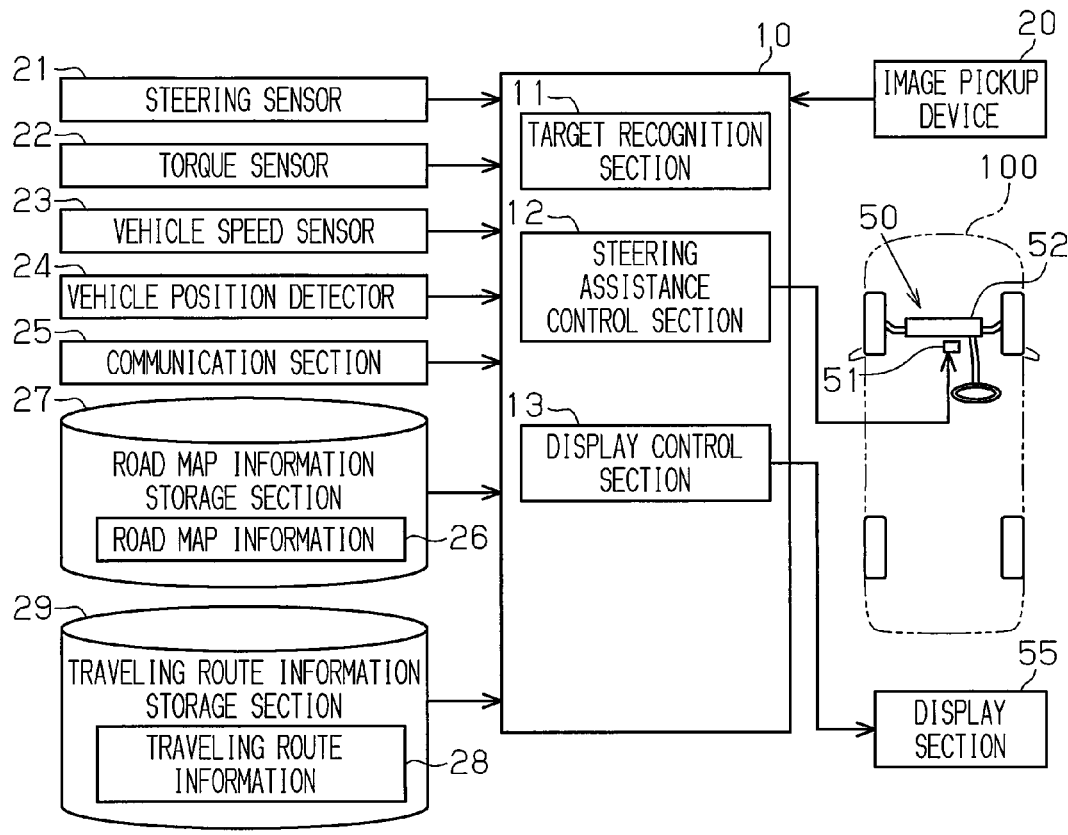
FIG. 11 is a block diagram schematically showing the configuration of a driving assistance apparatus according to a second embodiment.

As shown in FIG. 11, the driving assistance system includes a traveling route information storage section 29 that stores traveling route information 28 showing a route to a destination. The traveling route information 28 is data on node and links corresponding to traveling routes, for example. The traveling route information 28 may be created by a route search section (not shown) that searches for a route by using road map information, or may be created by the target recognition section 11, another control section, or the like, on the basis of the travel history of the vehicle 100. In addition, the traveling route information storage section 29 may be mounted in the vehicle 100, or may be a storage section of a portable information terminal that is brought into the vehicle 100.

The display control section 13 acquires the traveling route information 28 in a case where the target recognition section 11 detects a branch point to cause a branch road corresponding to a target track to be displayed in a discriminable manner and to cause a route guidance to be displayed.

Figure 12A:
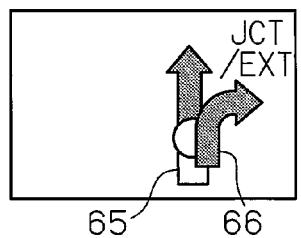
FIG. 12A shows an example in which route guidance is overlaid on a branch guidance view in the display section of FIG. 11.
Figure 12B:
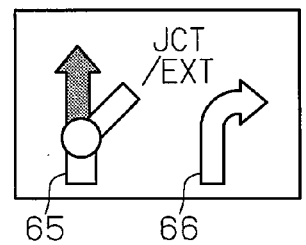
FIG. 12B shows an example in which the branch guidance view and the route guidance are shown in parallel in the display section of FIG. 11.
Figure 12C:
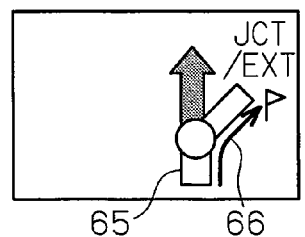
FIG. 12C shows an example in which the branch guidance view and the route guidance are shown in a coordinated manner in the display section of FIG. 11.

With reference to FIGS. 12A to 12C, a mode of the display will be described.

For example, as shown in FIG. 12A, a branch guidance symbol 65, which displays a target branch road of the steering assistance described above in a discriminable manner, and a route branch guidance symbol 66 may be displayed by overlapping each other. In addition, as shown in FIG. 12B, the branch guidance symbol 65 described above and the route branch guidance symbol 66 may be displayed in parallel. Further, as shown in FIG. 12C, the route branch guidance symbol 66 may be displayed in a mode in which the route branch guidance symbol 66 is coordinated with the branch guidance symbol 65 described above.

According to the second embodiment as described above, the following advantage is obtained in addition to the above described advantages (1) to (4).

(5) Branch guidance view in which a target branch road of the steering assistance described above is displayed in a discriminable manner and route guidance are simultaneously displayed in the display section 55. This allows the driver to easily determine whether the branch road corresponding to a target track matches with the direction of the traveling route.

OTHER EMBODIMENTS

The above described embodiments may be modified as follows.

Figure 13A:
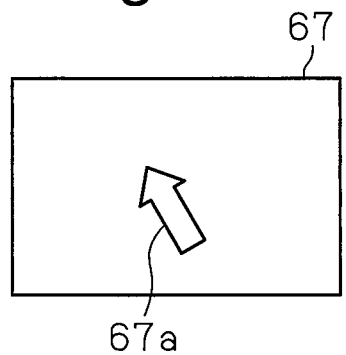
FIG. 13A is an example of displaying a branch road corresponding to a target track with only an arrow in a display section of a modification.
Figure 13B:
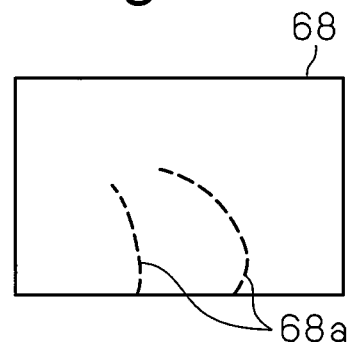
FIG. 13B is an example of displaying a recognition result of a lane division line with broken lines in a display section of a modification.

As with a branch guidance view 67 shown in FIG. 13A, a branch road corresponding to a target track may be displayed by an arrow 67a without displaying another branch road. In addition, as with a branch guidance view 68 shown in FIG. 13B, broken lines 68a showing a recognition result of the lane division lines may be displayed in a case where a target track is based on a lane division line. In the branch guidance view 67, in which the arrow 67a is displayed, it is necessary to compare with a front view. Thus, the guidance display in each of the embodiments described above has a tendency to require less time for driver's determination of whether his/her intended advancing direction matches with a target track than that of the display by using the arrow 67a. The branch guidance view 68, in which the broken lines 68a are displayed, requires the driver to grasp deviation between the broken lines 68a and the visually identified lane division lines ahead of the vehicle. Thus, the guidance display in each of the embodiments described above has a tendency to require less time for driver's determination of whether his/her intended advancing direction matches with a target track than that of the display by using the broken lines 68a.

In each of the embodiments described above, although information related to the LKA is output to the display section 55 as an image so that the image is provided to the driver, voice of guiding a direction of a branch road corresponding to a target track of the LKA may be output. In addition, providing information by voice may be performed together with output of guidance display to the display section 55.

In each of the embodiments described above, although both of the road map information storage section 27 and the communication section 25 are mounted in the driving assistance system, only one of them may be mounted.

The branch guidance view 68 may also be output in a shape corresponding to an actual road shape on the basis of the road map information 26 and the like. For example, a branch angle of each of branch roads, a vertical slope of a branch road, and the like may be displayed together with an actual branch road. In addition, a mark, an image, and the like near a gateway of a branch road may be displayed together with the branch guidance view 68.

In each of the embodiments described above, although the threshold value Tth for stopping the steering assistance described above is set in three stages, a plural number other than three may be set. For example, the threshold value Tth in a case where the target recognition section 11 does not detect a branch point is set larger than the threshold value Tth in a case where a branch point is detected so that the threshold value Tth may be set in two stages. Alternatively, the threshold value Tth may be set in four or more stages depending on the area and the type of roads.

The threshold value Tth for stopping the steering assistance described above may be changed on the basis of other information on a road connection state. For example, the threshold value Tth may be changed in accordance with the magnitude of the vehicle speed, the distance to a branch point, and the like.

In each of the embodiments described above, although a target track is calculated on the basis of lane division lines, the target track may be calculated on the basis of the track of a preceding vehicle. The track of a preceding vehicle is calculated by a known method, and is calculated on the basis of analysis of image data acquired from the image pickup device 20, and a relative position and a relative speed of the preceding vehicle based on detection signals acquired from an obstacle detection sensor (not shown) such as a radar sensor, for example. Even in this case, information related to a branch road corresponding to the target track can be provided as with each of the embodiments described above.

In each of the embodiments described above, although a target track is calculated on the basis of lane division lines, the target track may be calculated on the basis of the travel history of the host vehicle. Even in this case, information related to a branch road corresponding to the target track can be provided as with each of the embodiments described above.

In each of the embodiments described above, although the driving assistance apparatus 10 calculates a target track on the basis of lane division lines, the track of a preceding vehicle, and a target track that has been already calculated, such as a previous traveling track of the host vehicle, for example, may be acquired through an external network.

In the embodiment described above, although the threshold value Tth for stopping the steering assistance described above is changed on the basis of a connection state in conjunction with providing of information related to a branch road corresponding to a target track, only information related to the branch road corresponding to the target track may be provided. Even in this case, since the driver can easily determine whether his/her intended advancing direction matches with the branch road corresponding to the target track, it is possible to properly perform the steering assistance even near the branch road.

Information related to a branch road corresponding to a target track may be output to a portable information terminal that is brought into the vehicle or the navigation system that is mounted in the vehicle 100 other than to the display section 55 described above.

The driving assistance apparatus 10 may be a navigation system that is mounted in the vehicle 100, or may be mounted in a portable information terminal that is brought into the vehicle.

What is claimed is:

1. A driving assistance apparatus that causes a vehicle to follow a target track by assisting in steering of the vehicle, the apparatus comprising:
   a target recognition section that recognizes the target track ahead in an advancing direction of the vehicle;
   a steering assistance control section that controls a steering apparatus to perform steering assistance, thereby causing the vehicle to follow the target track; and
   an information providing section that, in a case where there is a branch point ahead in the advancing direction of the vehicle, provides a driver with information related to a first branch road corresponding to the target track in a plurality of branch roads branching from the branch point, wherein
   the steering assistance control section changes a threshold value for stopping the steering assistance in accordance with a branch attribute that is information related to a connection state of a branch road and indicates a diverting and merging section and a facility to which the branch road connects, and
   the steering assistance control section stops the steering assistance in a case where an operation amount of steering operation by the driver is greater than or equal to the threshold value.

2. The apparatus according to claim 1, wherein the information providing section notifies the driver of the first branch road among the branch roads in a manner discriminable from the other branch roads.

3. The apparatus according to claim 1, wherein the information providing section acquires traveling route information showing a traveling route of the vehicle, and provides information on a branch road corresponding to the traveling route in addition to information related to the first branch road.

4. The apparatus according to claim 1, wherein
   the information providing section provides the driver with the information related to the first branch road, and
   with respect to a branch road having a specific connection state in the other branch roads, the information providing section provides the driver with information related to a connection state of the branch road in association with the branch road having the specific connection state.

5. A method for assisting driving that causes a vehicle to follow a target track by assisting in steering of the vehicle, the method comprising:
   recognizing the target track ahead in an advancing direction of the vehicle;
   controlling a steering apparatus to perform steering assistance, thereby causing the vehicle to follow the target track;
   in a case where there is a branch point ahead in the advancing direction of the vehicle, providing a driver with information related to a first branch road corresponding to the target track in a plurality of branch roads branching from the branch point;
   changing a threshold value for stopping the steering assistance in accordance with a branch attribute that is information related to a connection state of a branch road and indicates a diverting and merging section and a facility to which the branch road connects; and
   stopping the steering assistance in a case where an operation amount of steering operation by the driver is greater than or equal to the threshold value.

\* \* \* \* \*